US012759821B2

(12) United States Patent
Tanaka

(10) Patent No.: US 12,759,821 B2
(45) Date of Patent: Oct. 13, 2026

(54) SHEET FEEDING DEVICE AND IMAGE FORMING APPARATUS INCORPORATING SAME

(71) Applicant: Mizuna Tanaka, Kanagawa (JP)

(72) Inventor: Mizuna Tanaka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 19/224,965

(22) Filed: Jun. 2, 2025

(65) Prior Publication Data

US 2025/0382145 A1 Dec. 18, 2025

(30) Foreign Application Priority Data

Jun. 13, 2024 (JP) ................................ 2024-095906

(51) Int. Cl.

| | |
|---|---|
| ***B65H 3/06*** | (2006.01) |
| ***B65H 1/04*** | (2006.01) |
| ***B65H 3/52*** | (2006.01) |
| ***B65H 5/06*** | (2006.01) |
| ***G03G 15/00*** | (2006.01) |
| *H04N 1/00* | (2006.01) |

(52) U.S. Cl.

CPC ........... *B65H 3/0684* (2013.01); *B65H 5/068* (2013.01); *G03G 15/6511* (2013.01); *B65H 2404/1521* (2013.01); *B65H 2407/21* (2013.01); *H04N 1/00602* (2013.01)

(58) Field of Classification Search

CPC ...... B65H 3/0684; B65H 3/5223; B65H 1/04; B65H 1/266; B65H 2405/324; B65H 2402/441; B65H 2701/21; G03G 15/6514; G03G 21/1628; G03G 2221/1687

See application file for complete search history.

(56) References Cited

U.S. PATENT DOCUMENTS 5,568,166 A * 10/1996 Yamazaki .............. B65H 1/266 271/10.01
2004/0178563 A1* 9/2004 Tsuchida .................. B65H 1/04 271/126
2008/0054554 A1 3/2008 Nishii et al.

(Continued)

FOREIGN PATENT DOCUMENTS

JP 07717650 A * 1/1995
JP 2001-278483 A 10/2001

(Continued)

*Primary Examiner* — Luis A Gonzalez

(74) *Attorney, Agent, or Firm* — XSENSUS LLP

(57) ABSTRACT

A sheet feeding device includes a cover, a pickup roller, a feed roller, a separator, a guide, and a receiving base. The cover includes a stacking portion on which sheets are stacked and a pivot shaft about which the cover is pivotable to open and close a body of the sheet feeding device. The pickup roller abuts against an upper face of a sheet of the sheets and feeds the sheet. The feed roller abuts against the upper face of the sheet fed from the pickup roller and feeds the sheet. The separator faces the feed roller to separate the sheet from the sheets. The guide guides the sheet fed from the feed roller. The receiving base holds the separator and includes a swing shaft swingably supported by the guide. When viewed from an axial direction of the swing shaft, the swing shaft overlaps with the cover opened.

20 Claims, 8 Drawing Sheets

(56) References Cited

U.S. PATENT DOCUMENTS

| | | | | |
|---|---|---|---|---|
| 2009/0121418 | A1 | 5/2009 | Tanaka et al. | |
| 2010/0059930 | A1 | 3/2010 | Tanaka et al. | |
| 2012/0104690 | A1 | 5/2012 | Tanaka et al. | |
| 2015/0259164 | A1 | 9/2015 | Horita et al. | |
| 2015/0274450 | A1* | 10/2015 | Fujii ........................ | B65H 3/68<br>271/127 |
| 2015/0274452 | A1 | 10/2015 | Tanaka et al. | |

FOREIGN PATENT DOCUMENTS

| | | | |
|---|---|---|---|
| JP | 2007-137526 | A | 6/2007 |
| JP | 2017-178620 | A | 10/2017 |

* cited by examiner

SHEET FEEDING DEVICE AND IMAGE FORMING APPARATUS INCORPORATING SAME

CROSS-REFERENCE TO RELATED APPLICATION

This patent application is based on and claims priority pursuant to 35 U.S.C. § 119(a) to Japanese Patent Application No. 2024-095906, filed on Jun. 13, 2024, in the Japan Patent Office, the entire disclosure of which is hereby incorporated by reference herein.

BACKGROUND

Technical Field

The present disclosure relates to a sheet feeding device and an image forming apparatus incorporating the sheet feeding device. Such an image forming apparatus is, for example, a copier, a printer, a facsimile machine, a plotter, an inkjet recording apparatus, or a multifunction peripheral having at least two of copying, printing, scanning, facsimile, and plotter functions.

Related Art

In general, saving energy and reducing a machine size are desired in an image forming apparatus such as a copier including a plain paper copier (PPC), a facsimile, a printer, a plotter, and an inkjet recording apparatus. The image forming apparatus forms an image on a medium such as a sheet-shaped recording medium that may be referred to simply as a sheet below. The sheet is accommodated in a unit or stacked in a sheet stacker. A conveyor conveys the sheet from the sheet stacker to the body of the image forming apparatus. To reduce the machine size, the size of the conveyor tends to be reduced.

SUMMARY

The present disclosure described herein provides a sheet feeding device including a cover, a pickup roller, a feed roller, a separator, a guide, and a receiving base. The cover includes a stacking portion on which multiple sheets are stacked and a pivot shaft about which the cover is pivotable to open and close a body of the sheet feeding device. The pickup roller abuts against an upper face of an uppermost sheet of the multiple sheets stacked on the stacking portion and feeds the uppermost sheet in a sheet feeding direction. The feed roller abuts against the upper face of the uppermost sheet fed from the pickup roller and feeds the uppermost sheet in the sheet feeding direction. The separator faces the feed roller to separate the uppermost sheet from the multiple sheets. The guide guides the uppermost sheet fed from the feed roller. The receiving base holds the separator and includes a swing shaft extending in an axial direction to be swingably supported by the guide around the swing shaft. The swing shaft of the receiving base overlaps with the cover in an opened state of the cover when viewed from the axial direction.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
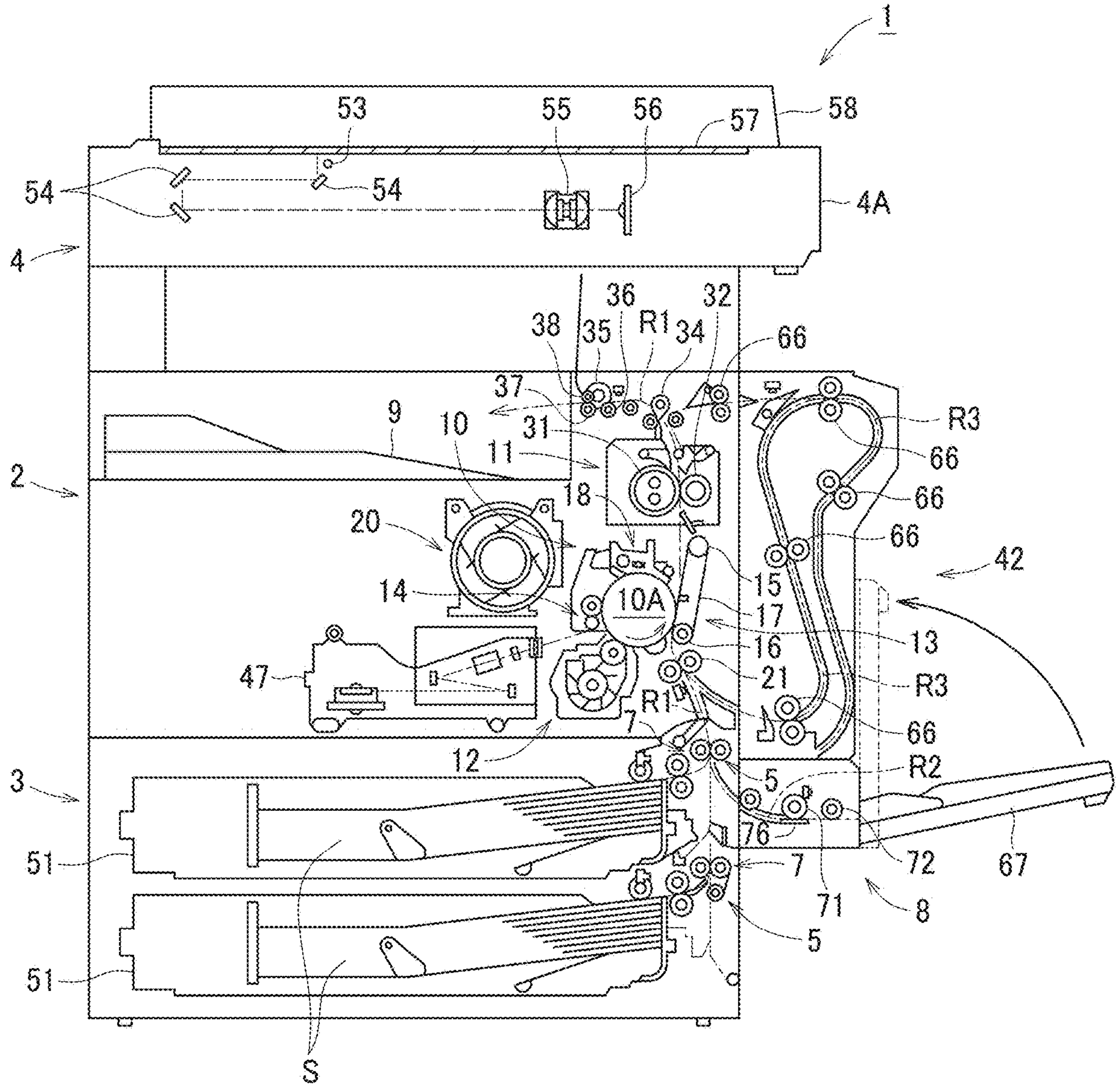
FIG. 1 is a schematic diagram illustrating a configuration of an image forming apparatus.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

With reference to the drawings, descriptions are given below of embodiments of the present disclosure. In the drawings illustrating the following embodiments, like reference signs are allocated to elements having the same function or shape and redundant descriptions thereof are omitted below.

Overall Configuration of Copier

An overall configuration of a copier 1 as an example of an image forming apparatus is described with reference to FIG. 1. In the following description, the term "image forming apparatus" means an apparatus that performs image formation by attaching developer or ink to a medium such as paper or an overhead projector (OHP) transparency. The term "image formation" means an action for providing (i.e., printing) not only an image having a meaning, such as texts and figures on a recording medium, but also an image having no meaning, such as patterns on the recording medium. In addition, the "sheet" includes thick papers, postcards, envelopes, thin papers, coated papers (coated papers, art papers, etc.), tracing papers, OHP sheets, OHP films, fiber, fabric, leather, metal, plastic films, glass, wood, and ceramics.

The copier 1 is a monochrome copier. The copier 1 reads an image on a surface of an original document and forms a copy image on the sheet. Size (dimension), material, shape, and relative positions used to describe each of the components and units are examples, and the scope of the present disclosure is not limited thereto unless otherwise specified.

The copier 1 includes an image forming apparatus body 2, a sheet feeder 3, and a scanner 4. The image forming apparatus body 2 includes an image forming section as an image forming device performing an image forming process based on the image read from the original document. The sheet feeder 3 supplies a sheet S one by one to the image forming apparatus body 2. The image forming apparatus body 2 is disposed on the sheet feeder 3, and the scanner 4 is disposed on the image forming apparatus body 2. The scanner 4 reads the image of the original document and sends image data of the original document to the image forming apparatus body 2.

The copier 1 includes an output tray 9 in a space formed above the image forming apparatus body 2 and below the scanner 4 to stack the sheet that passes through the image forming apparatus body 2 and is ejected from the image forming apparatus body 2. The copier 1 includes a sheet conveyance path R1, which may be also referred to simply as a conveyance path R1, to move the sheet S from the sheet feeder 3 to the output tray 9. Most of the conveyance path R1 extends from the sheet feeder 3 to the upper portion of the image forming apparatus body 2 in an upward direction perpendicular to a horizontal line, that is, in a vertically upward direction. Several sheet conveyors that are conveyor roller pairs are disposed on the conveying path R1 at a predetermined intervals corresponding to the minimum size of the sheet S.

At least one pair of these sheet conveyors nips and conveys the sheet S on the conveying path R1. Additionally, the sheet feeder 3 includes a sheet conveying device 5 to feed and convey the sheet S stored in each sheet tray of the sheet feeder 3 to a registration roller pair 21 on the conveying path R1. The copier 1 includes a sheet feeding device 8 to feed the sheet from a manual sheet feeder, which is described below with reference to FIGS. 2A and 2B.

The copier 1 includes a photoconductor unit 10 as the image forming section to form the image and a fixing device 11 in the image forming apparatus body 2. The photoconductor unit 10 and the fixing device 11 are disposed in this order from the upstream side to the downstream side of the conveyance path R1. The photoconductor unit 10 forms a toner image, and the toner image is transferred to the sheet S conveyed from the upstream side to the downstream side on the conveyance path R1. Subsequently, the fixing device 11 fixes the transferred toner image to the sheet S. The sheet S to which the toner image is fixed is ejected to the output tray 9 disposed at the end of the conveyance path R1.

The photoconductor unit 10 includes a drum-shaped photoconductor 10A as an image bearer. The photoconductor 10A is supported by a side plate of the image forming apparatus body 2 to be rotatable about a rotation shaft horizontally disposed. The photoconductor 10A has a cylindrical shape with a predetermined radius.

A driver such as a motor is disposed in any one of the photoconductor unit 10 and the image forming apparatus body 2 to transmit a rotational driving force to the photoconductor 10A. The driver rotates the photoconductor 10A at a stable constant speed in a rotation direction indicated by an arrow in FIG. 1.

The photoconductor unit 10 includes a developing device 12, a transfer device 13, a photoconductor cleaning device 18, a charge neutralizer, and a charging device 14 that are disposed around the photoconductor 10A in this order in a rotation direction indicated by an arrow in FIG. 1.

The developing device 12, the transfer device 13, the photoconductor cleaning device 18, the charge neutralizer, and the charging device 14 define a developing position, a transfer position, a cleaning position, a charge neutralizing position, and a charging position, respectively on a circle formed by the photoconductor 10A upstream to downstream in the rotation direction that is the counterclockwise direction in FIG. 1.

In addition, a latent image forming position is defined between the charging position and the developing position. An exposure device 47 is disposed obliquely below the photoconductor unit 10 at a position slightly away from the photoconductor unit 10 to irradiate the latent image forming position with a predetermined laser beam and write an invisible latent image corresponding to the image data. The photoconductor 10A is driven to rotate in the predetermined counterclockwise direction, and the developing device 12, the transfer device 13, the photoconductor cleaning device 18, the charge neutralizer, the charging device 14, and the exposure device 47 perform predetermined cooperative operations in synchronization with the rotation of the photoconductor 10A to execute a series of image forming processes.

The developing device 12 has an appropriate well-known configuration including a developing roller that generates a toner brush. The toner brush is formed by toner particles radially erected from the surface of the developing roller. The exposure device 47 forms the latent image at a predetermined position on the surface of the photoconductor 10A. The rotation of the photoconductor 10A moves the latent image to the developing position. The latent image passes through the developing position. Toner particles at the tip of the toner brush are stuck to the latent image to visualize the invisible latent image as a monochrome toner image.

The transfer device 13 includes two support rollers 15 and 16 that are disposed to face and separate from each other with a predetermined distance in a substantially vertical direction, and a transfer belt 17 formed as an endless belt and stretched between the support rollers 15 and 16. The transfer device 13 transfers the toner image on the outer circumferential surface of the photoconductor 10A to the sheet S and conveys the sheet S to which the unfixed toner image is transferred to the downstream side of the conveyance path R1. The transfer belt 17 is wound around the lower support roller 16, and the lower support roller 16 is pressed against a substantially diagonally right below portion of the photoconductor 10A. As a result, the transfer position is defined at a position at which the surface of the photoconductor 10A contacts the transfer belt 17. The upper support roller 15 is disposed in front of an inlet of the fixing device 11.

The photoconductor cleaning device 18 includes either or both of a blade and a rotating brush at the cleaning position on the photoconductor 10A. The blade has a blade edge at the tip of the blade. The blade edge abuts against the photoconductor 10A at the cleaning position with a predetermined pressure. The rotating brush contacts the photoconductor 10A at the cleaning position and rotates following the rotation of the photoconductor 10A. The photoconductor cleaning device 18 removes toner and foreign substances remaining on the surface of the photoconductor 10A after the transfer device 13 transfers the toner image to the sheet S.

The charge neutralizer includes a lamp emitting light of a predetermined intensity. The lamp irradiates the photoconductor at the charge neutralizing position with light for neutralization to neutralize the charge on the surface of the photoconductor 10A passing through the charge neutralizing position and return the surface potential of the photoconductor 10A after passing through the transfer position to the initial state.

The fixing device 11 includes a heating roller 31 and a pressure roller 32. The heating roller 31 includes an electric heater as a heat source. The pressure roller 32 is disposed substantially horizontally opposite to the heating roller 31 and pressed against the heating roller 31. A driver such as a motor drives and rotates the heating roller 31, and the rotation of the heating roller 31 rotates the pressure roller 32 in contact with the heating roller 31. A nip is formed at a portion at which the heating roller 31 contacts the pressure roller 32, and a predetermined heating temperature and a predetermined pressure are set in the nip to fix the toner image onto the sheet S.

As illustrated in FIG. 1, the copier 1 includes a toner container 20 such as a toner bottle containing fresh new toner and a toner conveyance path from the toner container 20 to the developing device 12. Since the developing device 12 develops the image and consumes the toner in the developing device 12, the fresh new toner is supplied from the toner container 20 to the developing device 12.

The sheet feeder 3 is disposed below the image forming apparatus body 2. According to the size of the original document read by the scanner 4, one of sheet sizes is automatically selected or manually selected by a user.

The sheet feeder 3 includes multiple trays 51 and 51 as sheet containers. The trays 51 and 51 are vertically arranged in the sheet feeder 3. The trays 51 and 51 are configured to be individually pulled out of the sheet feeder 3. The user can replenish an appropriate number of sheets to each of the trays 51 and 51. The trays 51 and 51 can store a large number of sheets S. The trays 51 and 51 may store different types of sheets such as the sheet sizes. The trays 51 and 51 may store sheets S in portrait or landscape, that is, in the vertical direction or the horizontal direction with respect to a sheet conveyance direction. The sheets S are stacked in each of the trays 51 and 51.

Figure 3A:
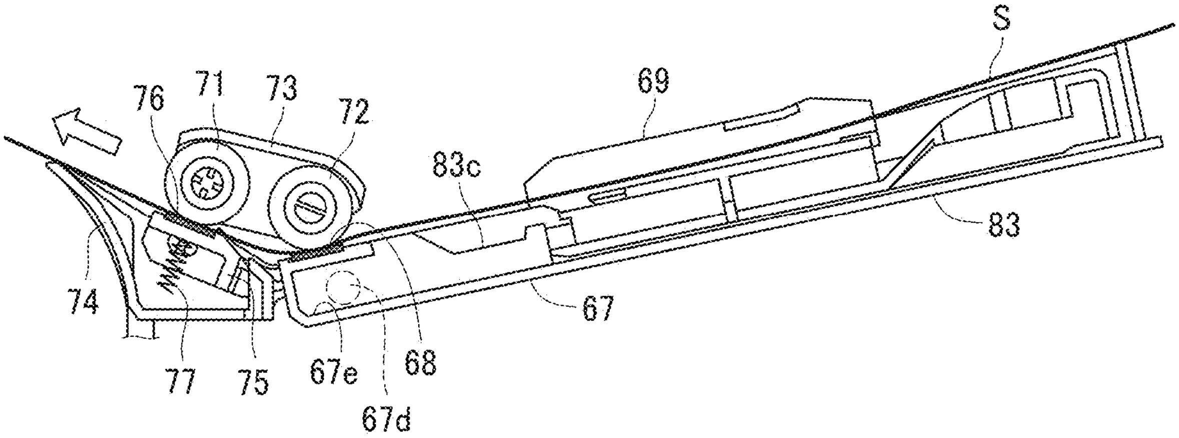
FIG. 3A is a cross-sectional side view of the sheet feeding device of FIG. 2A while a sheet is fed from a manual sheet feeder.
Figure 3B:
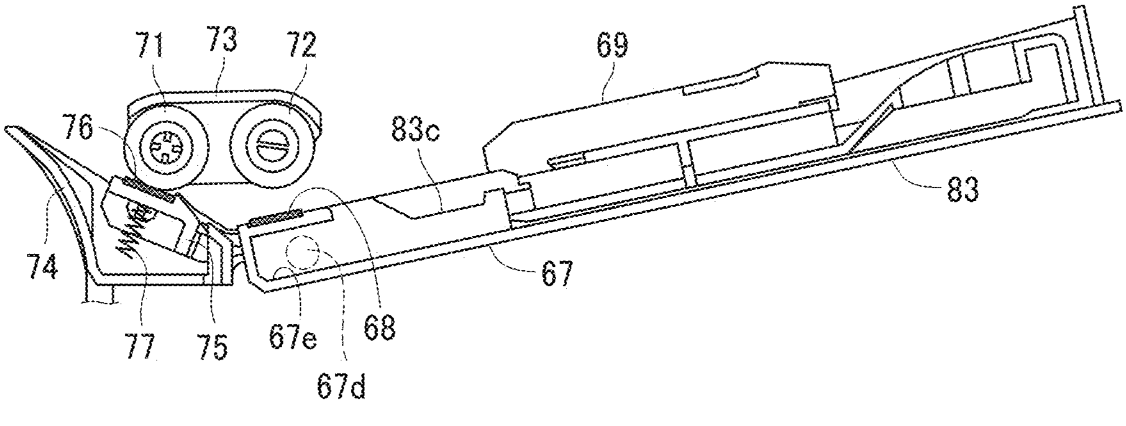
FIG. 3B is a cross-sectional side view of the sheet feeding device of FIG. 2A while feeding a sheet from a manual sheet feeder is stopped.
Figure 3C:
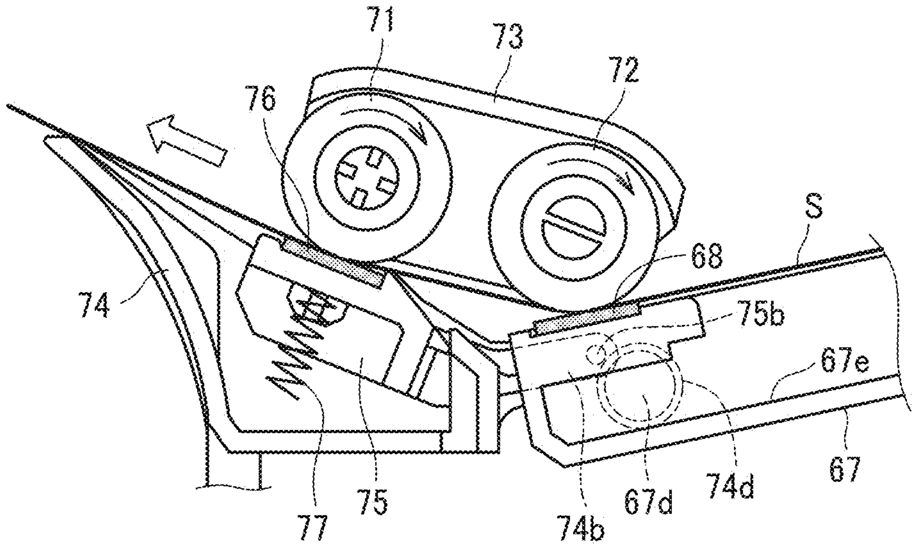
FIG. 3C is an enlarged view of a part of FIG. 3A.

A cover 67 is disposed on one side of a body including a body of the sheet feeder 3 or the image forming apparatus body 2. The cover 67 includes a manual sheet feeding tray. The cover 67 includes a pivot shaft 67*d* at a front end of the cover 67 as illustrated in FIGS. 3A to 3C that is the left end of the cover 67 in FIG. 1. The cover 67 pivots on the pivot shaft 67*d* to be openable and closable between a vertical storage position indicated by a broken line in FIG. 1 and an open position indicated by a solid line in FIG. 1.

A feed roller 71, a pickup roller 72, and a friction pad 76 are disposed as a manual feeding unit between the cover 67 and the body. The pickup roller 72 is an example of a sheet sending member that abuts against an upper face of an uppermost sheet of the sheets stacked on a stacking portion (sheet stacking ribs 83*a* and 83*b* described below) of the cover 67 and feeds the uppermost sheet to the feed roller 71.

The feed roller 71 is an example of a sheet feeder that abuts against the upper face of the sheet sent from the pickup roller 72 serving as the sheet sending member and feeds the sheet further downstream. The friction pad 76 is an example of a separator that separates the sheets one by one in cooperation with the feed roller 71. The friction pad 76 is described below.

The manual feeding unit conveys the sheet S set on the cover 67 to the image forming apparatus body 2 via the manual sheet feeding path R2. The manual feeding unit includes the cover 67, the feed roller 71, the pickup roller 72, and the friction pad 76.

The copier 1 includes a sheet reverse device 42 in the body. The sheet reverse device 42 includes a reverse conveyance path R3 as a front-back reverse device. After the image forming section forms and fixies the image on one side of the sheet S, the sheet reverse device 42 reverses the sheet S. The body includes the image forming apparatus body 2 or the body of the sheet feeder 3.

The sheet reverse device 42 includes multiple roller pairs 66 and guides inside the sheet reverse device 42. A driver drives and rotates the roller pairs 66. The guides face each other. The sheet feeder 3 includes sheet conveyance units 7 (that are grip roller pairs) vertically arranged. The downstream end of the reverse conveyance path R3 is connected to the conveyance path R1 at a connecting portion. The connecting portion is between the registration roller pair 21 and one of the sheet conveyance units 7 disposed above the other one of the sheet conveyance unit 7. A merging conveyance path, which is also referred to as "a merging portion," is formed downstream from the connecting portion.

The conveyance path R1, the manual sheet feeding path R2, and the reverse conveyance path R3 include guides facing each other with a predetermined gap between the guides as illustrated in FIG. 1. The configuration of the manual sheet feeding path R2 is described in detail below.

The scanner 4 includes a scanner body 4A forming the framework of the scanner 4 and a platen 57 disposed over a predetermined area on an upper face of the scanner body 4A. d area on an upper face of the scanner body 4A. Inside the scanner body 4A, a reading device is disposed. The reading device scans a predetermined area on the platen 57 to optically read the image of the original document. The reading device includes a first traveling body 53, a second traveling body 54, an imaging forming lens 55, and a reading sensor 56 including, for example, a charge-coupled device (CCD).

The scanner 4 includes a document pressing plate 58 disposed on the upper face of the scanner body 4A. The document pressing plate 58 is openable and closable between a closed position at which the document pressing plate 58 covers the platen 57 and an open position at which the document pressing plate 58 opens the platen 57. The document pressing plate 58 is larger than the platen 57 in the longitudinal direction and the lateral direction, and one end of the document pressing plate 58 is supported on the upper face of the scanner body 4A by a hinge so as to be freely opened and closed.

Operation of Copier

The operation of the copier 1 is described below based on the above-described configuration. When the document is copied by the copier 1, the user manually opens the document pressing plate 58 of the scanner 4 from the closed position to the open position, places and sets the document on the platen 57, and then manually moves the document pressing plate 58 to the closed position. The document pressing plate 58 presses the upper face of the document set on the platen 57. This operation fixes the document on the platen 57 and brings the document into close contact with the platen 57, and the document is spread in a planar shape, so that the document can be accurately read.

Immediately after the user presses and turns on a start switch on an operation screen in the copier 1, the scanner 4 starts a reading operation, and a driving mechanism moves the first traveling body 53 and the second traveling body 54. The light source in the first traveling body 53 irradiates the document with light. The light is reflected by the document surface and is directed to the second traveling body 54. The reflected light is reflected by the mirror in the second traveling body 54 and is input to the reading sensor 56 via the imaging forming lens 55. As a result, the image of the document is photoelectrically converted and read by the reading sensor 56.

Turning on the start switch as described above causes the photoconductor 10A of the photoconductor unit 10 to start rotating, and the photoconductor unit 10 starts an operation of forming a toner image on the photoconductor 10A based on the read document image. After the start of the rotation of the photoconductor 10A, a part of the outer circumferential surface of the photoconductor 10A sequentially passes through the charging position defined by the charging device 14, the latent image forming position formed by the exposure device 47, the developing position defined by the developing device 12, the transfer position defined by the transfer device 13, the cleaning position defined by the photoconductor cleaning device 18, and the charge neutralizing position defined by the charge neutralizer. The following cycle is sequentially performed. The charging device 14 charges the part of the photoconductor 10A to the predetermined potential. The exposure device 47 forms the latent image on the part of the photoconductor 10A. The developing device 12 visualizes the latent image as the toner image. The transfer device 13 transfers the toner image to the sheet S. The photoconductor cleaning device 18 removes the residual toner from the part of the photoconductor 10A. The charge neutralizer neutralizes the charge on the part of the photoconductor 10A. Then, the cycle is completed. The cycle is continued in a predetermined time to form the toner image in a range of a predetermined length of the outer circumferential surface of the photoconductor 10A in the rotation direction of the photoconductor 10A in accordance with the size of the image to be formed.

Pressing the start switch as described above causes the sheet conveying device 5 assembled to the tray 51 to convey one sheet S from the tray 51 storing the sheets S to the conveyance path R1 via a predetermined sheet conveyance path. The tray 51 is automatically or manually selected from the trays 51 in the sheet feeder 3. The conveyance rollers convey the sheet S substantially vertically upward on the conveyance path R1 in the image forming apparatus body 2. The leading end of the sheet S abuts against a portion immediately before the nip of the registration roller pair 21, and the registration roller pair 21 temporarily stops conveying the sheet S.

On the other hand, when the sheet is fed from the manual sheet feeding tray, the sheet is conveyed as follows. The pickup roller 72 of the manual feeding unit rotates to feed the sheet S set on the cover 67. When multiple sheets S are fed, the feed roller 71 and the friction pad 76 separate the sheets S one by one and conveys the sheet S to the manual sheet feeding path R2. The sheet S conveyed to the manual sheet feeding path R2 is further conveyed to the conveyance path R1. The leading end of the sheet S abuts against a portion immediately before the nip of the registration roller pair 21, and the registration roller pair 21 temporarily stops conveying the sheet S.

The registration roller pair 21 starts rotating at an accurate timing in accordance with the relative movement of the toner image on the photoconductor 10A that is driven to rotate to feed the sheet S that has been stopped temporarily to the transfer position. As a result, the transfer device 13 transfers the toner image onto the sheet S.

The transfer belt 17 of the transfer device 13 forms a part of the conveyance path R1 and conveys the sheet S on which the unfixed monochrome toner image is transferred as described above to the fixing device 11. The fixing device 11 forms the nip. The sheet S passes through the nip. In the nip, applying predetermined heat and pressure to the sheet S fixes the toner image onto the sheet S. A switching claw 34 guides the sheet S onto which the toner image is fixed to the conveyance path R1 leading the sheet S to the output tray 9. Ejection rollers 35 to 38 eject the sheet S to the output tray 9. As a result, the sheet S is stacked on the output tray 9. The user in front of the copier 1 can take out the sheets stacked on the output tray 9 from an opening portion between the output tray 9 and the scanner 4.

When a double-sided copy mode is selected by the user's setting input, the switching claw 34 guides the sheet S having the toner image fixed on one side to the sheet reverse device 42. In the sheet reverse device 42, multiple roller pairs 66 and guides reciprocate the sheet S in the reverse conveying path R3 to reverse the front and back faces of the sheet.

The reversed sheet S is returned to the conveyance path R1, conveyed on the conveyance path R1, and guided to the transfer position again. The image is transferred and fixed to the back face of the sheet S, and the ejection rollers 35 to 38 finally ejects the sheet S onto the output tray 9. The registration roller pair 21 functions as a registration unit that corrects the posture of the sheet conveyed by the sheet conveyance units 7, the manual feeding unit, and the sheet reverse device 42.

Details of Sheet Feeding Device

Figure 2A:
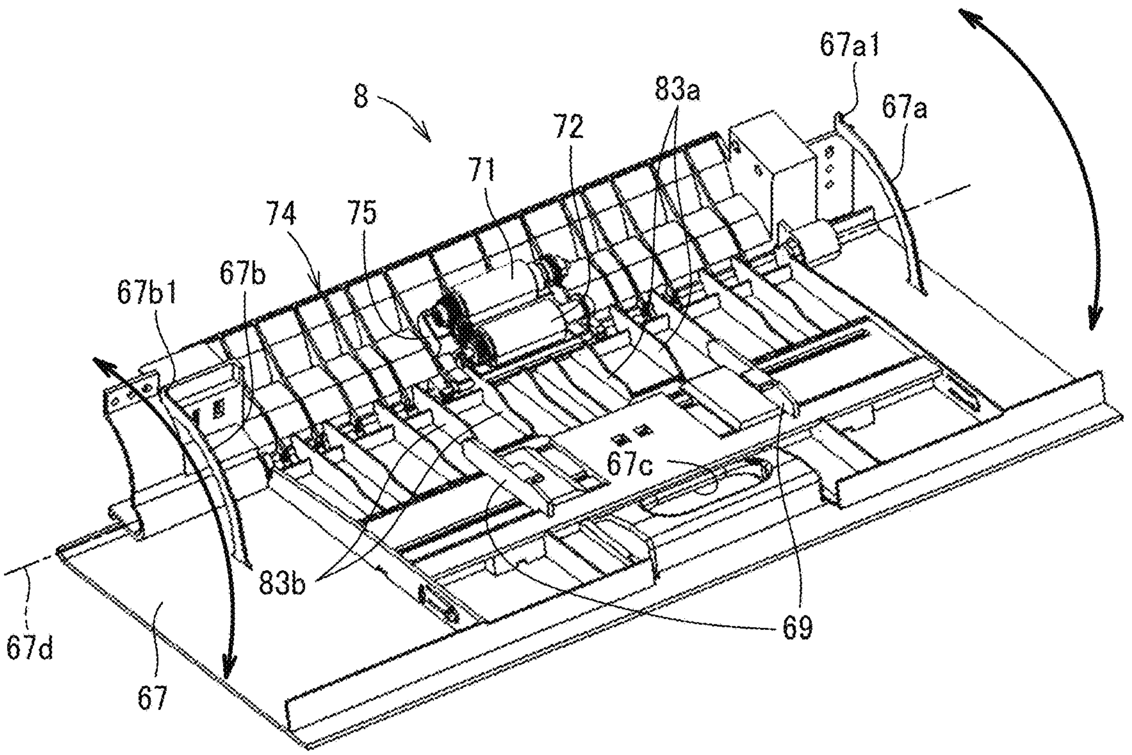
FIG. 2A is a perspective view of a sheet feeding device including a cover opened.
Figure 2B:
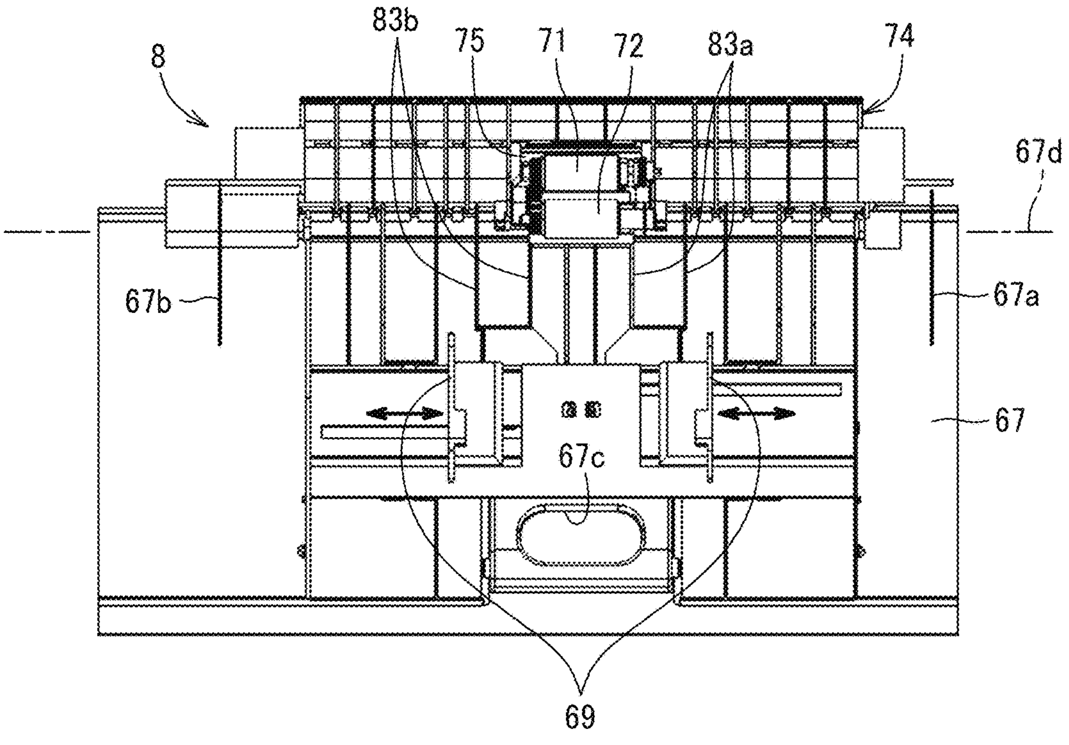
FIG. 2B is a plan view of the sheet feeding device of FIG. 2A.

FIGS. 2A and 2B illustrate the sheet feeding device 8. The sheet feeding device 8 includes the manual feeding unit and a guide 74. The manual feeding unit includes the cover 67, the feed roller 71, the pickup roller 72, and the friction pad 76. The cover 67 includes a pair of arc-shaped arms 67*a* and 67*b* arranged in the right and left parts of the cover 67 in FIG. 2B. A side face of the body of the copier 1 (that is a side face of the sheet reverse device 42) has a pair of guide holes corresponding to the pair of arc-shaped arms 67*a* and 67*b*. The pair of arc-shaped arms 67*a* and 67*b* are slidably inserted into the pair of guide holes, respectively.

The cover 67 has a handle hole 67*c* in the upper end portion of the cover 67 (that is the lower end portion of the cover 67 in FIG. 2B). To use the sheet feeding tray, the user hooks a fingertip on the handle hole 67*c* and opens the cover 67 from a vertically set position indicated by a dashed line in FIG. 1 to an opened position indicated by a solid line in FIG. 1.

When the cover 67 is opened, each of a bent tip 67*a*1 of the arc-shaped arm 67*a* and a bent tip 67*b*1 of the arc-shaped arm 67*b* is engaged with the inside of each of the guide holes on the side face of the body. As a result, the cover 67 is held at the open position as illustrated in FIGS. 2A and 2B.

Multiple sheet stacking ribs 83*a* and 83*b* are disposed on an upper face of the cover 67 that is an inner face of the exterior face 83. The sheet stacking ribs 83*a* and 83*b* extend in a sheet feeding direction in which the sheet is fed. The sheet stacking ribs 83*a* and 83*b* function as a stacking portion for the sheets (particularly, the stacking portion to stack the sheet front end portion).

In other words, the sheet stacking ribs 83*a* and 83*b* are designed so that the front end portions of the sheets stacked on the cover 67 are placed on the upper end edges of the sheet stacking ribs 83*a* and 83*b*. The multiple sheet stacking ribs 83*a* and 83*b* reduce a frictional force between the cover 67 and the sheet moving in the sheet feeding direction and increase the rigidity of the cover 67. The conventional sheet feeding device does not include the above-described sheet stacking ribs. The upper face of the cover known in the art is typically flat.

A pair of lateral side restricting plates 69 are disposed upstream from the sheet stacking ribs 83*a* and 83*b* in the sheet feeding direction. A moving mechanism known in the art uses a pinion gear and a rack gear and symmetrically slides the lateral side restricting plates 69 in the lateral direction in FIG. 2B that is indicated by arrows.

The front end of the cover 67 opened is adjacent to the guide 74 close to the body. The feed roller 71 and the pickup roller 72 are disposed on the guide 74.

A bottom plate pad 68 is disposed in the front end of the cover 67 (in other words, a downstream end portion of the cover in the sheet feeding direction) so as to face the pickup roller 72 (See FIGS. 3A to 3C). The bottom plate pad 68 is made of a material having a high friction coefficient, such as urethane rubber (rubber hardness: 80°). The bottom plate pad 68 corresponds to a sheet-feeder-side separator.

The cover 67 includes an inclined portion 67*f* formed at a center part in the lateral direction of the front end of the cover 67. The inclined portion 67*f* is adjacent to the downstream side of the bottom plate pad 68. The inclined portion 67*f* lifts up the front end of the sheet S conveyed downstream by the pickup roller 72 toward the feed roller 71.

Figure 2C:
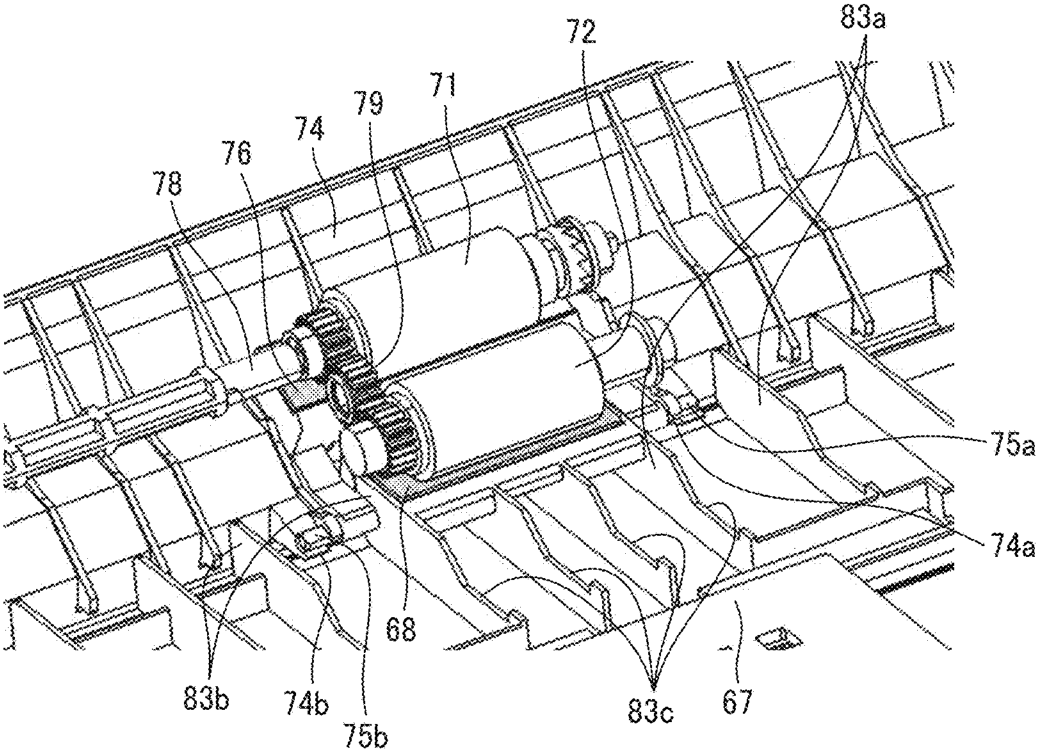
FIG. 2C is an enlarged view of a part of the sheet feeding device of FIG. 2A.
Figure 2D:
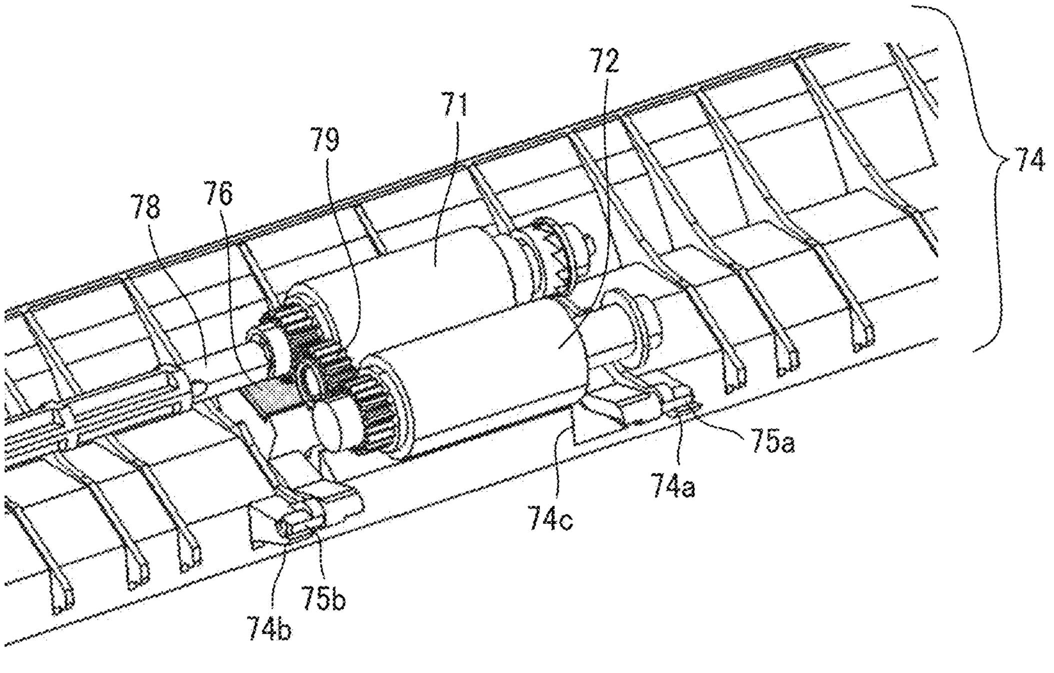
FIG. 2D is a view of the part of the sheet feeding device of FIG. 2C from which a cover is removed.

As illustrated in FIG. 2C, a feed shaft 78 supports the feed roller 71 and the pickup roller 72. The rotation of the feed shaft 78 is transmitted to the feed roller 71, and the rotation of the feed roller 71 is transmitted to the pickup roller 72 via an idler gear 79.

One end of the feed shaft 78 supports the feed roller 71, and the other end of the feed shaft 78 is supported by a housing of the copier 1. A driver is coupled to the other end of the feed shaft 78. The driver rotates the feed roller 71 and the pickup roller 72, which enables feeding the sheet S.

A sheet feeding holder 73 as a support rotatably supports the feed roller 71, the pickup roller 72, and the idler gear 79. A height detector is disposed on the sheet feeding holder 73 to detect the height of the sheets placed on the sheet stacking ribs 83*a* and 83*b* of the cover 67 and detect whether the sheet is on the sheet stacking ribs 83*a* and 83*b*.

Based on the detection result of the height detector, the pickup roller 72 moves up and down between a lowered position illustrated in FIG. 3A and a raised position illustrated in FIG. 3B so as to correspond to the height of the sheet. At the raised position in FIG. 3B, the user can place and add sheets on the cover 67.

The guide 74 has a rectangular cutout 74*c* formed in an outer end (a front end) of the guide 74. The cutout 74*c* is located below the pickup roller 72. When the user rotates the cover 67 about the pivot shaft 67*d* and opens the cover 67 outward from the position indicated by the dashed line to the position indicated by the solid line in FIG. 1 to use the manual sheet feeding tray, the bottom plate pad 68 at the front end of the cover 67 is received in the cutout 74*c*.

Figure 4A:
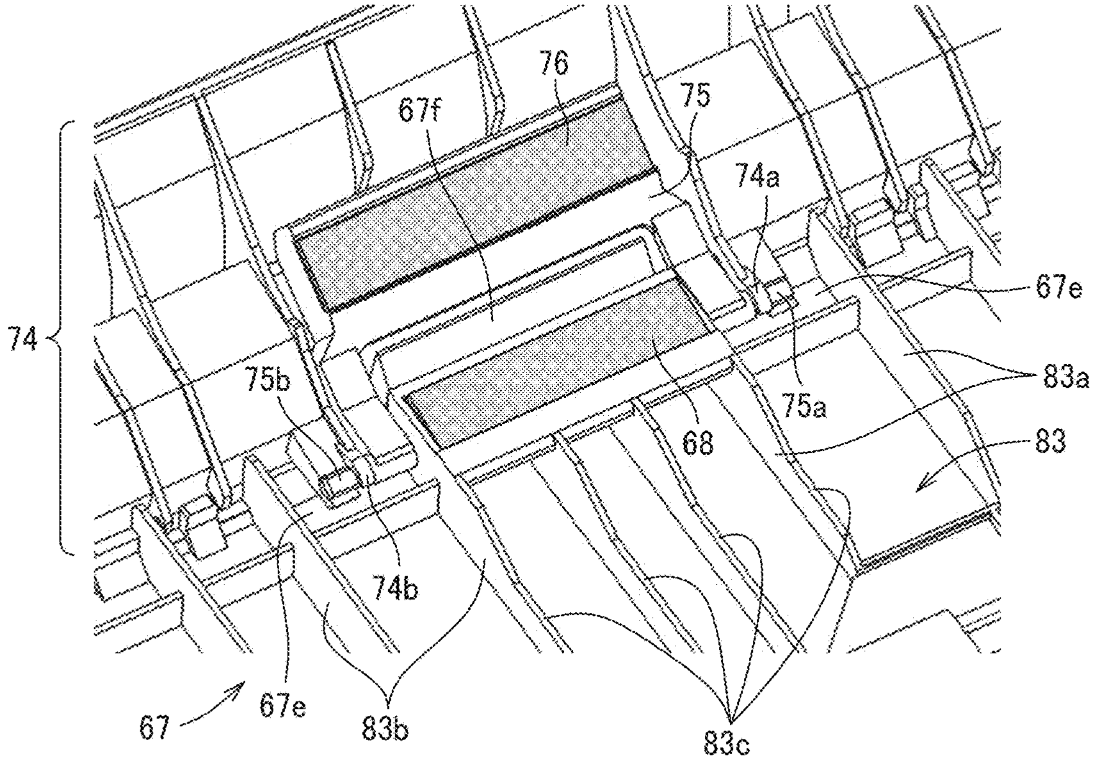
FIG. 4A is a view of the part of the sheet feeding device of FIG. 2C from which a feed shaft, a feed roller, a pickup roller, and an idler gear are removed.
Figure 4B:
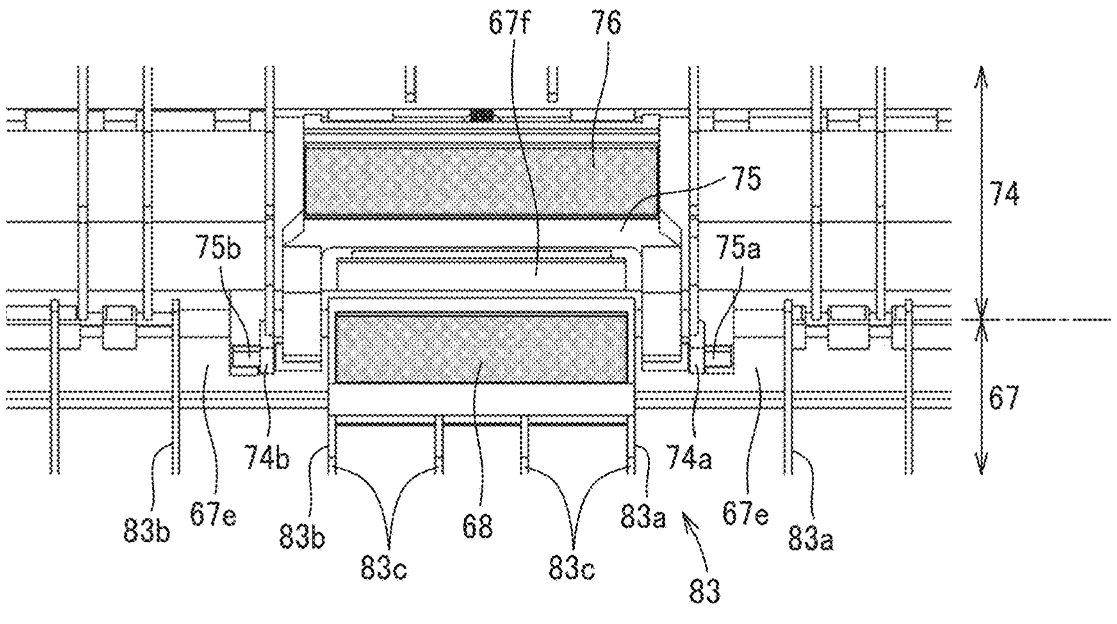
FIG. 4B is a plan view of FIG. 4A.
Figure 4C:
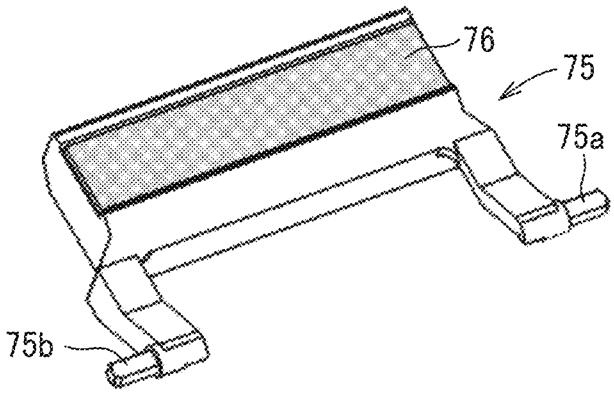
FIG. 4C is a perspective view of a receiving base.

As illustrated in FIGS. 4A to 4C, the guide 74 supports a receiving base 75 including a friction pad 76 so as to be swingable in the vertical direction. The friction pad 76 is fixed to the upper face of the receiving base 75 with an adhesive. The friction coefficient between the friction pad 76 and the sheet is designed to be larger than the friction coefficient between the sheets and smaller than the friction coefficient between the feed roller 71 and the sheet, which causes the friction force difference. The friction force difference enables the feed roller 71 to feed the uppermost sheet of multiple sheets overlaid and fed to the nip between the friction pad 76 and the feed roller 71 downstream.

The receiving base 75 includes a pair of swing shafts 75*a* and 75*b* arranged at the right side and the left side as illustrated in FIG. 4C. On the other hand, the guide 74 includes a pair of receiving base holders 74*a* and 74*b* that protrude outward (in other words, toward the front side). The receiving base holders 74*a* and 74*b* swingably support the swing shafts 75*a* and 75*b*, respectively. As illustrated in FIGS. 4A to 4C, the bottom plate pad 68 is disposed between the pair of swing shafts 75*a* and 75*b* in an axial direction of the swing shaft, the axial direction orthogonal to the sheet feeding direction that is also the lateral direction in FIG. 4B and a direction in which the sheet stacking ribs 83*a* and 83*b* are arranged side by side.

As illustrated in FIG. 3C, the upper end of a compression coil spring 77 is in contact with the lower face of the receiving base 75. The compression coil spring 77 presses the receiving base 75 to rotate about the swing shafts 75*a* and 75*b* clockwise in FIG. 3C. The above-described structure enables the friction pad 76 to be pressed against the feed roller 71 substantially perpendicular to the sheet conveyance direction.

The friction pad 76 is made of a material having a high friction coefficient, such as urethane rubber (rubber hardness: 80°). Pressing the friction pad 76 against the feed roller 71 with a constant pressure (for example, 100 $g/cm^2$ to 250 $g/cm^2$) by the compression coil spring 77 enables the feed roller 71 and the friction pad 76 to maintain good separation performance of the sheets, maintain good followability to the sheet, and reduce vibration of the friction pad 76.

Specifically, the friction coefficient between the friction pad 76 and the sheet S is set to be higher than the friction coefficient between the sheets S and lower than the friction coefficient between the feed roller 71 and the sheet S. Thus, even if two or more sheets S enter the nip between the friction pad 76 and the feed roller 71, the sheets S can be separated one by one and fed downstream.

Position of the Swing Shaft in the Receiving Base

As illustrated in FIG. 3C, the pair of swing shafts 75*a* and 75*b* of the receiving base 75 are arranged in the lateral direction and positioned in a first recess 67*e* as a recess formed inside a downstream end portion of the cover 67 in the sheet feeding direction. The swing shafts 75*a* and 75*b* of the receiving base 75 overlap with the opened cover 67 when viewed from the axial direction of the swing shafts 75*a* and 75*b*.

In addition, as illustrated in FIG. 2C, the swing shaft 75*a* of the receiving base 75 and the receiving base holder 74*a* holding the swing shaft 75*a* are positioned in a space between the sheet stacking ribs 83*a* in the right part of FIG. 2C. The swing shaft 75*b* of the receiving base 75 and the receiving base holder 74*b* holding the swing shaft 75*b* are positioned in a space between the sheet stacking ribs 83*b* in the left part of FIG. 2C. The above-described configuration enables the pivot shaft 67*d* of the cover 67 to avoid interference with the receiving base holders 74*a* and 74*b* holding the swing shafts 75*a* and 75*b* of the receiving base 75 and be located as close as possible to the body. Further, the swing shafts 75*a* and 75*b* and the receiving base holders 74*a* and

74*b* that are positioned below a sheet passing region through which the sheet S passes do not hinder a sheet passing performance of the sheet S.

Figure 3D:
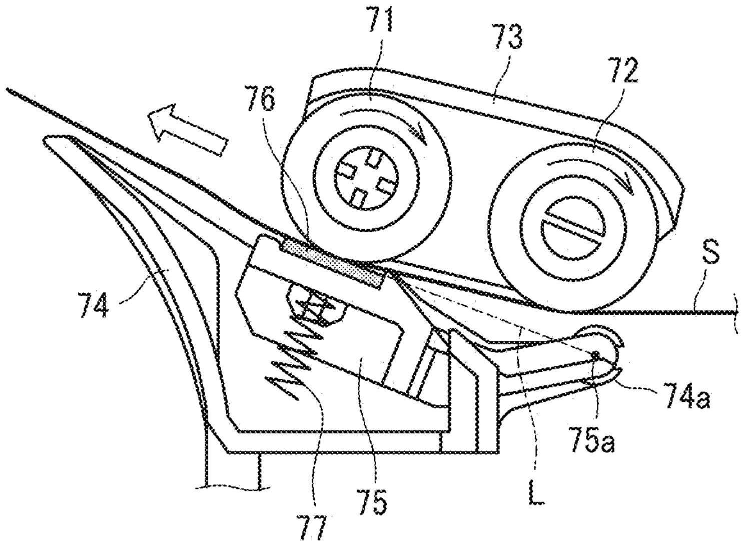
FIG. 3D is a view of a part of FIG. 3C to illustrate a positional relationship between a swing shaft of a receiving base and a nip tangent of a feed roller.

FIG. 3D illustrates a positional relationship between the swing shaft 75*a* of the receiving base 75 and a nip tangent L of the nip between the feed roller 71 and the friction pad 76. As illustrated in FIG. 3D, the swing shaft 75*a* of the receiving base 75 supporting the friction pad 76 is on the nip tangent L.

The above-described positional relationship prevents the friction pad 76 from being applied with a force in a direction away from the feed roller 71 when the feed roller 71 is driven. Additionally, the above-described positional relationship prevents the occurrence of abnormal sound due to vibration of the friction pad 76.

If the swing shaft 75*a* of the receiving base 75 is disposed downstream from the nip of the friction pad 76 in the sheet feeding direction, the sheet that enters the nip and lowers the receiving base 75 increases the angle between the sheet S and the friction pad 76. Then, the load of the feed roller 71 increases, which stops feeding the sheet. For this reason, it is desirable that the swing shaft 75*a* is disposed upstream from the nip of the friction pad 76.

Vertical Storage of Cover 67

Figure 5A:
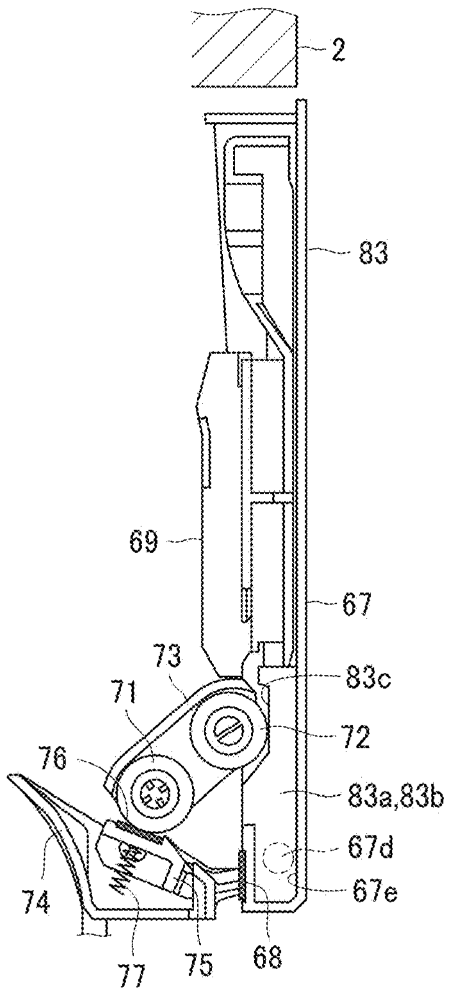
FIG. 5A is a cross-sectional side view of the sheet feeding device of FIG. 2A vertically storing the cover.
Figure 5B:
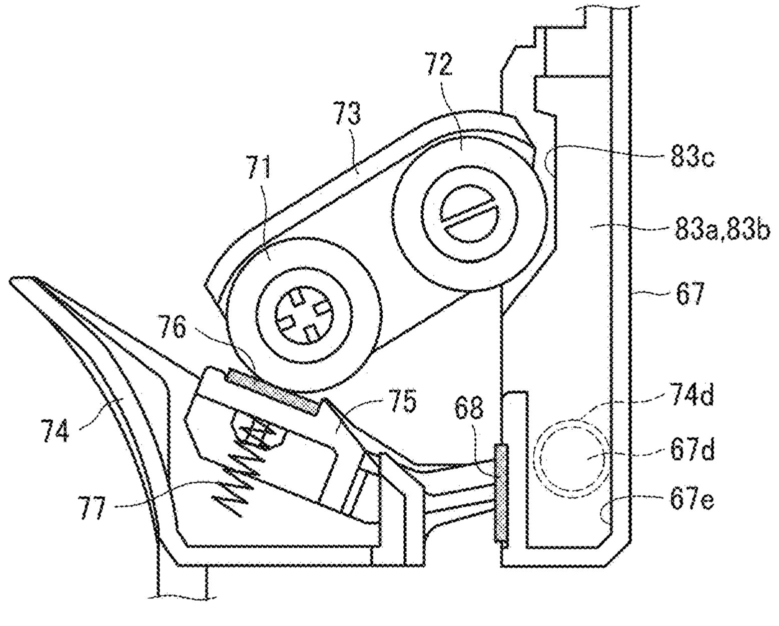
FIG. 5B is an enlarged view of a part of FIG. 5A.

When the manual sheet feeding tray is not used, the cover 67 may be vertically stored in the body of the copier 1 as illustrated in FIGS. 5A and 5B. Rotating the cover 67 upward about the pivot shaft 67*d* to vertically store the cover 67 in the body moves the pickup roller 72 upward along the sheet stacking ribs 83*a* and 83*b* as illustrated in FIGS. 5A and 5B. As a result, the sheet feeding holder 73 is inclined upward to the right in FIGS. 5A and 5B about the feed roller 71 (and the feed shaft 78).

Inclining the sheet feeding holder 73 upward to the right as illustrated in FIGS. 5A and 5B causes a part of the outer peripheral portion of the pickup roller 72 to be housed in (in other words, enter) a second recess 83*c* as another recess formed by the sheet stacking ribs 83*a* and 83*b*. The above-described configuration can vertically store the cover 67 at a position closer to the body than a conventional configuration, which can downsize the copier 1 maintaining the sheet feeding performance. The second recess 83*c* reduces the right upward inclination angle of the sheet feeding holder 73 and avoids the pickup roller 72 from interfering with surrounding components above the pickup roller 72 when the copier 1 is downsized.

The guide 74 includes a pair of shaft receiving portions 74*d* arranged in the lateral direction. The shaft receiving portion 74*d* projects outward (in other words, toward the front side) from the guide 74 The pair of shaft receiving portions 74*d* rotatably supports the pivot shaft 67*d* of the cover 67. The shaft receiving portion 74*d* is positioned in the first recess 67*e* formed inside the cover 67. The shaft receiving portion 74*d* overlaps with the body of the cover 67 when viewed from the axial direction of the pivot shaft 67*d*. Together with the shaft receiving portion 74*d*, the swing shafts 75*a* and 75*b* of the receiving base 75 and the receiving base holders 74*a* and 74*b* are also positioned in the first recess 67*e* formed inside the cover 67 (see FIG. 3C).

If the manual sheet feeding tray includes the pivot shaft disposed between the cover and the body to rotate the cover, disposing the cover vertically stored in the body to be close to the body is difficult.

In contrast, the swing shafts 75*a* and 75*b* of the receiving base 75 and the shaft receiving portions 74*d* of the receiving base holders 74*a* and 74*b* in the present embodiment are disposed to overlap the body of the cover 67 (in other words, the first recess 67*e*) when the swing shafts 75*a* and 75*b* and the shaft receiving portions 74*d* are viewed in the axial direction of the swing shafts 75*a* and 75*b*. This structure enables the cover 67 vertically stored in the body to place closer to the body than the above-described cover. As a result, the structure in the present embodiment can reduce the size of the copier 1 maintaining the sheet feeding performance.

The present disclosure has been described above on the basis of the embodiments, but the present disclosure is not limited to the embodiments. Needless to say, various alterations can be made in the scope of the technical idea described in the scope of the claims. For example, the friction pad is described as an example of the separator in the above-described embodiment, but the separator may be a separation roller.

The following describes preferred aspects of the present disclosure.

First Aspect

In a first aspect, a sheet feeding device is characterized as follows. The sheet feeding device includes a feeding unit, a guide, and a receiving base. The feeding unit includes a cover, a sheet sending member, a sheet feeder, and a separator. The cover is pivotable about a pivot shaft to open and close a body of the sheet feeding device. The cover includes a stacking portion. Sheets are stacked on the stacking portion of the cover opened. The sheet sending member abuts against an upper face of an uppermost sheet of sheets stacked on the stacking portion and sends the uppermost sheet. The sheet feeder abuts against the upper face of the uppermost sheet sent from the sheet sending member and feed the uppermost sheet. The separator is disposed to face the sheet feeder and separates the sheets one by one. The guide guides the sheet fed from the sheet feeder. The guide supports the receiving base so that the receiving base can swing about a swing shaft, and the receiving base holds the separator. The swing shaft of the receiving base overlaps with the opened cover when viewed from an axial direction of the swing shaft.

Second Aspect

In a second aspect, the sheet feeding device according to the first aspect is characterized as follows. the swing shaft of the receiving base is positioned in a first recess formed at a downstream end portion of the cover in a sheet feeding direction.

Third Aspect

In a third aspect, the sheet feeding device according to the second aspect is characterized as follows. A shaft receiving portion receiving the pivot shaft of the cover is positioned in the first recess of the cover.

Fourth Aspect

In a fourth aspect, the sheet feeding device according to any one of the first to third aspects is characterized as follows. The stacking portion includes multiple ribs formed to extend in a sheet feeding direction, and the sheets are stacked on an upper end edge of the rib.

Fifth Aspect

In a fifth aspect, the sheet feeding device according to any one of the first to fourth aspects is characterized as follows. The swing shaft of the receiving base is positioned between the ribs adjacent to each other in a direction orthogonal to the feeding direction.

Sixth Aspect

In a sixth aspect, the sheet feeding device according to any one of the first to fifth aspects is characterized as follows. The sheet sending member is housed in the body side by the closing operation of the cover, and a second recess is formed at an upper end edge of the rib. An outer peripheral portion of the sheet sending member is housed in the second recess.

Seventh Aspect

In a seventh aspect, the sheet feeding device according to any one of the first to sixth aspects is characterized as follows. A receiving base holder holding the swing shaft of the receiving base is positioned between the ribs adjacent to each other in a direction orthogonal to the sheet feeding direction.

Eighth Aspect

In an eighth aspect, the sheet feeding device according to any one of the first to seventh aspects is characterized as follows. The sheet feeding device further includes a sheet-feeder-side separator disposed to face the sheet sending member. The sheet-feeder-side separator separates the sheets one by one. The sheet feeding device includes a pair of swing shafts including the swing shaft, and the sheet-feeder-side separator is interposed by the pair of swing shafts in a direction orthogonal to a sheet feeding direction.

Ninth Aspect

In a ninth aspect, an image forming apparatus is characterized by including the sheet feeding device according to any one of the first to eighth aspects.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. A sheet feeding device comprising:

a cover including:

a stacking portion on which multiple sheets are stacked; and a pivot shaft about which the cover is pivotable to open and close a body of the sheet feeding device;

a pickup roller to:

abut against an upper face of an uppermost sheet of the multiple sheets stacked on the stacking portion; and feed the uppermost sheet in a sheet feeding direction;

a feed roller to:

abut against the upper face of the uppermost sheet fed from the pickup roller; and feed the uppermost sheet in the sheet feeding direction;

a separator facing the feed roller to separate the uppermost sheet from the multiple sheets;

a guide to guide the uppermost sheet fed from the feed roller;

a receiving base holding the separator and including a swing shaft extending in an axial direction to be swingably supported by the guide around the swing shaft; and a shaft receiving portion in a recess of the cover, the shaft receiving portion receiving the pivot shaft of the cover, wherein the swing shaft of the receiving base overlaps with the cover in an opened state of the cover when viewed from the axial direction, the cover has the recess at a downstream end of the cover in the sheet feeding direction, and the swing shaft is disposed in the recess of the cover.

2. An image forming apparatus comprising:

the sheet feeding device according to claim 1; and an image forming section to form an image on the uppermost sheet fed from the sheet feeding device.

3. The sheet feeding device according to claim 1, wherein:

the stacking portion includes multiple ribs extending in the sheet feeding direction, and at least one of the ribs has an upper end edge to stack the sheets.

4. The sheet feeding device according to claim 3, wherein:

the swing shaft of the receiving base is disposed between the ribs adjacent to each other in the axial direction orthogonal to the sheet feeding direction.

5. The sheet feeding device according to claim 3, wherein:

the upper end edge of the at least one of the ribs forms another recess, and said another recess in the cover closed houses a part of an outer peripheral portion of the pickup roller.

6. The sheet feeding device according to claim 3, further comprising:

a receiving base holder between the ribs adjacent to each other in the axial direction orthogonal to the sheet feeding direction, the receiving base holder receiving the swing shaft of the receiving base.

7. The sheet feeding device according to claim 1, further comprising:

another separator facing the pickup roller to separate the uppermost sheet from the multiple sheets, wherein the receiving base includes a pair of swing shafts including the swing shaft, and said another separator is interposed between the pair of swing shafts in the axial direction orthogonal to the sheet feeding direction.

8. A sheet feeding device comprising a cover including:

a stacking portion on which multiple sheets are stacked; and a pivot shaft about which the cover is pivotable to open and close a body of the sheet feeding device;

a pickup roller to:

abut against an upper face of an uppermost sheet of the multiple sheets stacked on the stacking portion; and feed the uppermost sheet in a sheet feeding direction;

a feed roller to:

abut against the upper face of the uppermost sheet fed from the pickup roller; and feed the uppermost sheet in the sheet feeding direction;

a separator facing the feed roller to separate the uppermost sheet from the multiple sheets;

a guide to guide the uppermost sheet fed from the feed roller; and a receiving base holding the separator and including a swing shaft extending in an axial direction to be swingably supported by the guide around the swing shaft, wherein the swing shaft of the receiving base overlaps with the cover in an opened state of the cover when viewed from the axial direction, the stacking portion includes multiple ribs extending in the sheet feeding direction, and at least one of the ribs has an upper end edge to stack the sheets.

9. The sheet feeding device according to claim 8, wherein;

the swing shaft of the receiving base is disposed between the ribs adjacent to each other in the axial direction orthogonal to the sheet feeding direction.

10. The sheet feeding device according to claim 8, wherein:

the upper end edge of the at least one of the ribs forms another recess, and said another recess in the cover closed houses a part of an outer peripheral portion of the pickup roller.

11. The sheet feeding device according to claim 8, further comprising:

a receiving base holder between the ribs adjacent to each other in the axial direction orthogonal to the sheet feeding direction, the receiving base holder receiving the swing shaft of the receiving base.

12. An image forming apparatus comprising:

the sheet feeding device according to claim 8; and an image forming section to form an image on the uppermost sheet fed from the sheet feeding device.

13. The sheet feeding device according to claim 8, wherein:

the cover has a recess at a downstream end of the cover in the sheet feeding direction, and the swing shaft is disposed in the recess of the cover.

14. The sheet feeding device according to claim 13, further comprising:

a shaft receiving portion in the recess of the cover, the shaft receiving portion receiving the pivot shaft of the cover.

15. The sheet feeding device according to claim 8, further comprising:

another separator facing the pickup roller to separate the uppermost sheet from the multiple sheets, wherein the receiving base includes a pair of swing shafts including the swing shaft, and said another separator is interposed between the pair of swing shafts in the axial direction orthogonal to the sheet feeding direction.

16. A sheet feeding device comprising:

a cover including:

a stacking portion on which multiple sheets are stacked; and a pivot shaft about which the cover is pivotable to open and close a body of the sheet feeding device;

a pickup roller to:

abut against an upper face of an uppermost sheet of the multiple sheets stacked on the stacking portion; and feed the uppermost sheet in a sheet feeding direction;

a feed roller to:

abut against the upper face of the uppermost sheet fed from the pickup roller; and feed the uppermost sheet in the sheet feeding direction;

a separator facing the feed roller to separate the uppermost sheet from the multiple sheets;

a guide to guide the uppermost sheet fed from the feed roller;

a receiving base holding the separator and including a swing shaft extending in an axial direction to be swingably supported by the guide around the swing shaft; and another separator facing the pickup roller to separate the uppermost sheet from the multiple sheets, wherein the swing shaft of the receiving base overlaps with the cover in an opened state of the cover when viewed from the axial direction, the receiving base includes a pair of swing shafts including the swing shaft, and said another separator is interposed between the pair of swing shafts in the axial direction orthogonal to the sheet feeding direction.

17. An image forming apparatus comprising:

the sheet feeding device according to claim 16; and an image forming section to form an image on the uppermost sheet fed from the sheet feeding device.

18. The sheet feeding device according to claim 16, wherein:

the cover has a recess at a downstream end of the cover in the sheet feeding direction, and the swing shaft is disposed in the recess of the cover.

19. The sheet feeding device according to claim 18, further comprising:

a shaft receiving portion in the recess of the cover, the shaft receiving portion receiving the pivot shaft of the cover.

20. The sheet feeding device according to claim 16, wherein:

the stacking portion includes multiple ribs extending in the sheet feeding direction, and at least one of the ribs has an upper end edge to stack the sheets.

* * * * *